May 1, 1956     O. E. SEIFERTH     2,744,020
PACKAGING METHOD
Original Filed Oct. 21, 1950     2 Sheets-Sheet 1
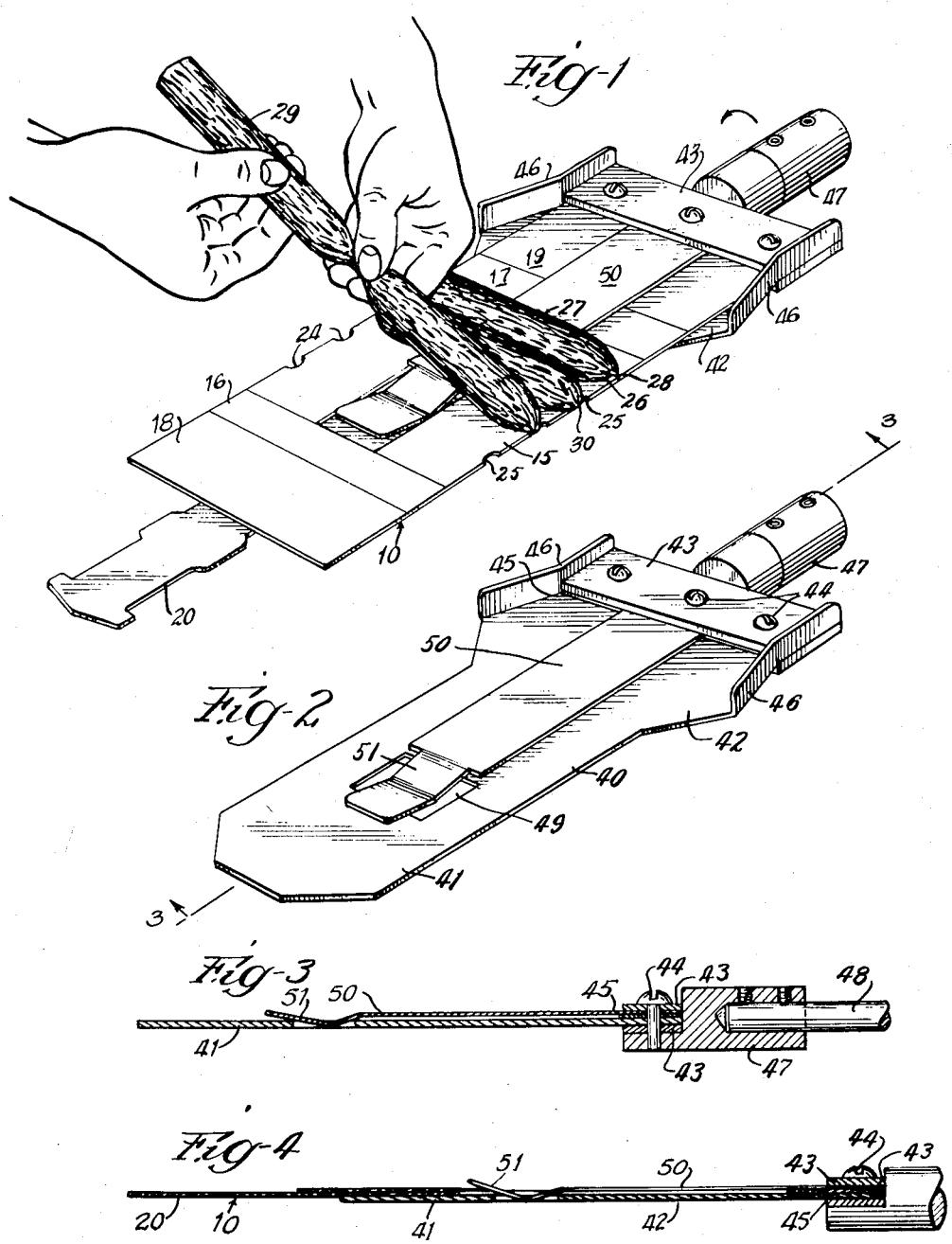
INVENTOR.
Oscar E. Seiferth.
BY
Cromwell, Greist & Warden
Attys.

May 1, 1956 O. E. SEIFERTH 2,744,020
PACKAGING METHOD
Original Filed Oct. 21, 1950 2 Sheets—Sheet 2
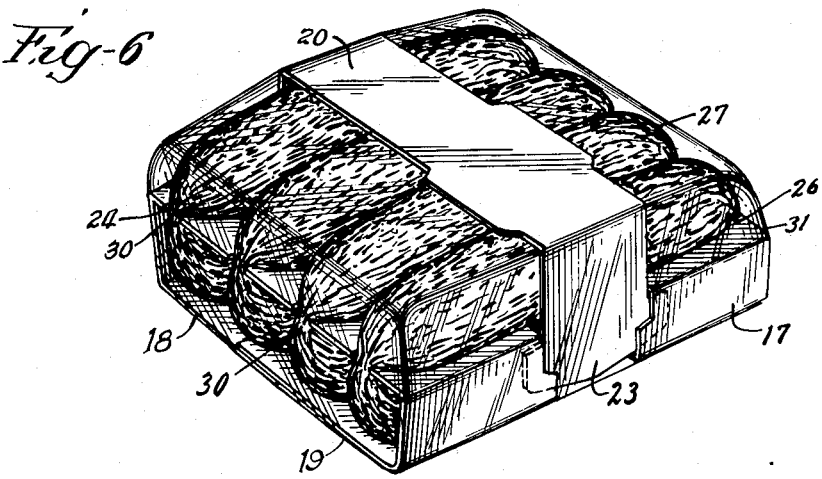
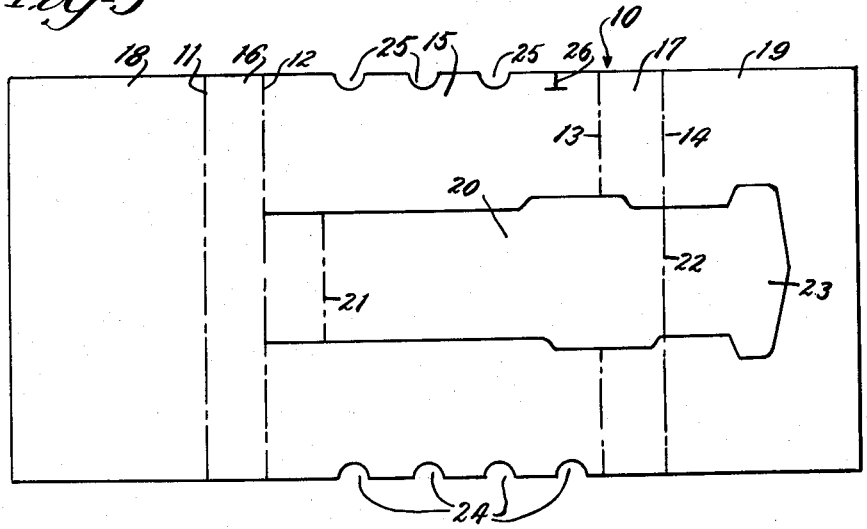
INVENTOR.
Oscar E. Seiferth
BY
Cromwell, Greist + Wooden
Attys.

United States Patent Office 2,744,020
Patented May 1, 1956

2,744,020

PACKAGING METHOD

Oscar E. Seiferth, Madison, Wis., assignor to Oscar Mayer & Co., Inc., Chicago, Ill., a corporation of Illinois Original application October 21, 1950, Serial No. 191,366, now Patent No. 2,686,929, dated August 24, 1954. Divided and this application February 17, 1954, Serial No. 410,830

8 Claims. (Cl. 99—174)

This invention relates to packaging and is more particularly concerned with the fabrication of a package containing a plurality of connected links of sausage or a similar product, arranged in side-by-side relation alternately on opposite sides of a paperboard backing member which is folded to hold the links thereon in compact relation.

This application is a division of application Serial No. 191,366, filed October 21, 1950 and now Patent Number 2,686,929 issued on August 24, 1954.

It is a general object of the invention to provide a method of forming a neat and compact package containing a predetermined quantity of sausage or a similar product, wherein the sausage is formed into links which are assembled in side-by-side relation on opposite sides of a paperboard backing member, and the backing member is thereafter folded to partially enclose the sausage links and to retain the links in assembled relation thereon.

It is a more specific object of the invention to provide a method of forming a package of link sausages wherein a paperboard backing member is provided which is cut and creased to form a plurality of panels, with an intermediate panel being adapted to receive on opposite sides thereof a plurality of links of saugsage and with the other panels forming wall members which are adapted to be folded around the sausages on opposite faces of the intermediate panel, and, wherein the sausage links are formed from a predetermined length of filled sausage casing by rotating the backing member while simultaneously dividing the casing manually into successive links and arranging the links in side-by-side relation alternately on opposite faces of the intermediate panel.

It is a further object of the invention to provide a method of forming a package of link sausages in which a predetermined weight of sausage meat is divided into connected links and arranged with the link in juxtaposed relation on opposite sides of an intermediate portion of a paperboard backing member, the backing member being provided with a cut-out strap portion which is folded in confining relation over the outer face of the sausages on one side of the package and the terminal end portions of the backing member being folded over the sausages on the other side of the package in side wall and bottom enclosing relation with one of the side wall forming portions being interlocked with the end of the strap portion.

It is another object of the invention to provide a method of forming a package of the type described wherein a backing member is supported on a rotatable fixture plate, the sausage links are formed and and rotated to impart a twist in the casing between adjacent links while at the same time the links are assembled with the backing member, the assembled backing member and links are removed from the fixture plate, the wall forming panels of the backing member are folded around the links and finally a transparent sheet material is wrapped around the same to retain the links and the backing member in assembled relation while permitting visual inspection of a substantial portion of the sausage.

These and other objects of the invention will be apparent from a consideration of the method of packaging and the apparatus provided for carrying out the same which are illustrated in the accompanying drawings, wherein:

Fig. 1 is a perspective view illustrating certain steps in a method of packaging which incorporates the principal features of the invention;

Fig. 2 is a perspective view of a fixture adapted to be used in carrying out the method;

Fig. 3 is a longitudinal section through the fixture, taken on line 3—3 of Fig. 2;

Fig. 4 is a longitudinal section similar to Fig. 3 but with the backing member for the package in position thereon;

Fig. 5 is a plan view of a blank cut and scored to provide the backing member for the package; and Fig. 6 is a perspective view of the completed package.

Referring to the drawings, there is illustrated in Fig. 5 a generally rectangular blank 10 of paperboard or similar material which is adapted to form a backing and reinforcing member for the package which is illustrated in Fig. 6.

The blank 10 is divided by longitudinally spaced, generally parallel, transverse score lines 11, 12, 13 and 14, into a relatively large central panel 15, relatively narrow adjoining panels 16 and 17, and end panels 18 and 19. The central panel 15 forms an intermediate backing member for the package contents, the narrow panels 16 and 17 form side walls of the package and the end panels 18 and 19 are overlapped to form a bottom wall of the package. The blank 10 is also die-cut centrally to provide a foldable strap member 20 which extends from the crease line 12, through the panels 15 and 17 and into the end panel 19. The strap member 20 is provided with transverse score lines 21 and 22, the former being spaced from the score line 12 a distance approximately equal to the distance between the score lines 11 and 12 and the latter being aligned with the score line 14. The strap 20 is provided at the free end with an enlarged tab formation 23, the terminal edge of which is spaced from the transverse score line 22 approximately twice the distance between the score lines 13 and 14. The central panel 15 is provided along one longitudinal or outer edge with a plurality of longitudinally spaced relatively shallow recesses 24 and along the opposite outer edge with similarly spaced recesses 25 and a T-shaped slot 26, the latter being substituted for one of the recesses 25 at one corner of the panel 15.

The central panel 15 is adapted to support on its opposite faces a plurality of connected link sausages 27 (Fig. 6) which are arranged in generally parallel transversely extending relation on both faces of the panel 15, alternate sausages 27 being arranged on opposite faces of the panel. The connected sausages are arranged with the free end 28 of the casing 29 engaged in the T-shaped slot 26 and the connecting areas 30 between the sausages 27 arranged in the recesses 24 and 25 to properly position the sausages 27 on the panel. The blank is folded to bring the panels 16 and 17 into approximately right angled relation with the panel 15 and to bring the end panels 18 and 19 in overlapping relation over the outer face of the row of sausages 27 which is arranged on one side of the panel 15. The strap 20 which is folded back about the crease line 12 before the sausages 27 are positioned on the panel 15 is folded about the outer face of the row of sausages 27 on the other side of the panel 15 with the tab end 23 engaged in the slot formed by cutting out the strap 20 in the panel 17 to hold the sausages on that side of the panel 15 in position thereon. The entire assembly of backing member 10 and sausages 27 is enclosed in an outer transparent wrapper 31. For a more complete description of the package reference may be had to applicant's Patent No. 2,646,357 issued July 21, 1953.

The package may be conveniently formed or assembled with the use of the fixture 40 which is illustrated in Figs. 1, 2 and 4 and which comprises a supporting plate member having a generally rectangular outer portion 41 and a widened base portion 42. The base 42 is secured between a pair of end cross plates 43 by screws 44. An intermediate end plate 45 which is approximately the thickness of the backing member 10 extends between the top end plate 43 and the base portion 42 of the supporting plate with an edge thereof forming an end abutment or stop member. The base portion 42 is provided at the side edges with relatively narrow upstanding flanges 46 which are in opposed relation and which have outwardly flared portions extending toward the free end portion 41 of the fixture. The base portion 42 of the fixture 40 is secured to a short stub shaft 47 which is adapted to be mounted on a rotating member such as the driven shaft 48 (Fig. 3) of a motor (not shown) which is electrically connected with a suitable switch under the control of the operator. The outer plate portion 41 is provided with a relatively small cut out opening 49 of generally rectangular shape and a relatively narrow clamping plate 50 extends from the cross plates 43 to the opening 49 with a small end section 51 of reduced width and having a reverse bend intermediate its ends adapted to be moved into the opening 49.

In assembling the sausages 27 on the panel 15 the blank 10 is arranged on the fixture 40 in face-to-face relation with the plate sections 41 and 42, after the strap 20 has been bent back about the crease line 12 to extend outwardly of the outer end of the blank, as shown in Fig. 1, with the opposite end of the blank in abutting relation with the transverse edge of the plate 45. The clamping plate 50 extends out over the major portion of the blank with the reversely bent end section 51 adapted to move through the slot in the blank which is left by bending back the strap 20 and into the opening 49 in the plate section 41.

With the supporting blank 10 arranged on the fixture 40 in the position described the operator first engages the loose end 28 at one end of a predetermined length of filled casing 29 in the T-shaped slot 26 in the panel 15. The operator then divides off the first sausage 27 and twists the remainder of the casing 29 to provide a separating twist 30 between it and the next sausage 27 to be formed. The length of the sausage link 27 is made approximately the width of the panel 15. The fixture 40 is then rotated to bring the opposite face of the blank supporting plate uppermost, the sausage link which has been formed being arranged on the panel 15 with the twisted portion 30 of the casing arranged in the recess 24 opposite the T-slot 26. The operator measures off a second sausage 27 and twists the remainder of the casing to provide a separating twist 30 between it and the next succeeding sausage. The second sausage link is positioned on the panel 15 and the fixture 40 is again rotated to bring the opposite face uppermost. This procedure is continued until all of the filled casing 29 has been divided into individual sausage links 27 and placed on the panel 15 with alternate sausages in row forming relation on opposite faces of the panel 15. Thereafter the blank 10 is removed from the fixture 40 and the panels 16, 17, 18 and 19 and strap 20 are folded around the two rows of sausages 27 to provide the package formation shown in Fig. 6. The package is completed by wrapping the assembly thus formed in an outer transparent wrapper 31. Before the outer wrapper 31 is applied the weight of the package is checked and if insufficient an additional link of the required size may be placed at the end of the bottom row where it will be substantially covered by the folded portions of the blank.

I claim:

1. A method of forming a package of sausage links which comprises rotating a generally rectangular supporting blank to wind thereabout a predetermined length of filled sausage casing, dividing the casing into a plurality of successive sausage links and imparting a twist in the casing between each of said links and the next succeeding link, arranging alternate links in side-by-side row forming relation on opposite faces of the supporting blank with the areas of the casing connecting the links positioned along the edges of the supporting blank, folding portions of the blank over the row of links on each side of the supporting blank to retain the links on the blank, and enclosing the assembled links and supporting blank in an outer wrapper.

2. A method of forming a package of sausage links which comprises rotatably supporting a generally rectangular blank, winding about the blank a predetermined length of filled sausage casing by rotating the blank, dividing the casing into a plurality of connected sausage links and imparting a twist in the casing between adjoining links, and arranging the links in side-by-side row forming relation on opposite faces of the supporting blank while rotating the blank to wind the linked casing about the same.

3. A method of forming a filled sausage casing into links and wrapping the same, comprising dividing a continuous length of the casing into successive links of uniform length and rotating the casing about its longitudinal axis to impart a twist in the area of the casing connecting each of the succeeding links while simultaneously winding the casing about a generally rectangular supporting member of relatively thin flat material, the length of the links being approximately equal to the lineal dimension of the supporting member about which the casing is being wound and the twisted areas of the casing between adjacent links being located along the opposed marginal edges of the supporting member, thereafter folding portions of the supporting member about the links, and enclosing the links and supporting member in an outer wrapper.

4. A method of forming a length of filled sausage casing into links and wrapping the same, comprising dividing the length of casing into a plurality of links of predetermined length and rotating the casing about its longitudinal axis to impart a predetermined number of twists in the area of the casing connecting each link with the adjoining links while simultaneously winding the casing about a supporting member of relatively thin flat material, the length of the links being approximately equal to the lineal dimension of the supporting member about which the casing is being wound and the twisted areas of the casing between adjacent links being located along opposed marginal edges of the supporting member with alternate links in parallel row forming relation on opposite faces thereof, folding portions of the supporting member about each row of links after the winding operation is completed, and enclosing the links and supporting member in an outer wrapper.

5. A method of forming and wrapping sausage links which comprises dividing a continuous length of filled sausage casing into successive links and imparting a twist in the casing between each link and the adjoining links while simultaneously winding the same about a generally rectangular supporting blank of relatively stiff material, the links being formed of a length which is approximately the same as the lineal dimension of the blank about which the casing is wound, and thereafter enclosing the assembled links and supporting blank in an outer transparent wrapper.

6. A method of forming a length of filled sausage casing into links and wrapping the same, comprising dividing the casing into successive links of the predetermined length and rotating the casing about its longitudinal axis to impart a predetermined number of twists in the area of the casing connecting each of the succeeding links, winding the casing about a generally rectangular supporting member of relatively thin flat material, the length of the links being approximately equal to the lineal dimension of the supporting member about which the casing is wound and the twisted areas of the casing between adjacent links being located along the opposed marginal edges of the supporting member, and thereafter enclosing the assembled links and supporting member in an outer wrapper.

7. A method of forming a package of connected sausage links which comprises dividing a continuous length of filled sausage casing into successive links and rotating the casing about its longitudinal axis to twist the casing in the area of the casing connecting each link with the succeeding link, winding the connected links about a generally rectangular supporting member of relatively thin flat material by securing an end of the casing to one edge of the supporting member and rotating the supporting member to position the connected links in alternate relation on opposite faces of the supporting member, the links being positioned transversely of the supporting member and the twisted areas of the casing between adjacent links being substantially aligned approximately along the marginal edges of the supporting member, and thereafter covering the links and supporting member with an outer wrapper.

8. A method of forming a length of filled sausage casing into links and wrapping the same in a paperboard wrapper, comprising supporting a paperboard blank on a generally rectangular support member, dividing the length of casing into a plurality of links of predetermined length and rotating the support member and the blank thereon about the longitudinal axis of the support member while rotating the casing about its longitudinal axis to twist the area of the casing which connects each link with the adjoining links and to wind the casing about portions of the paperboard blank the length of the links being approximately equal to the lineal dimension of the blank about which the casing is being wound and the twisted areas of the casing between adjacent links being located along opposed marginal edges of the blank with alternate links in parallel row forming relation on opposite sides thereof, folding portions of the blank about each row of links after the winding operation is completed to hold the links in supporting relation thereon and removing the assembly from the support member.

References Cited in the file of this patent

UNITED STATES PATENTS 2,646,357     Seiferth _____ July 21, 1953